(12) United States Patent
Brault et al.

(10) Patent No.: US 7,491,031 B2
(45) Date of Patent: Feb. 17, 2009

(54) BALANCING DEVICE OF A TURBOMACHINE ENGINE

(75) Inventors: Michel Gilbert Roland Brault, Boussy Saint-Antoine (FR); Maurice Guy Judet, Dammarie les Lys (FR); Thomas Langevin, Dammarie les Lys (FR)

(73) Assignee: SNECMA, Paris (FR)

( * ) Notice: Subject to any disclaimer, the term of this patent is extended or adjusted under 35 U.S.C. 154(b) by 354 days.

(21) Appl. No.: 11/405,457

(22) Filed: Apr. 18, 2006

(65) Prior Publication Data

US 2006/0245925 A1 Nov. 2, 2006

(30) Foreign Application Priority Data

Apr. 29, 2005 (FR) .................................. 05 51127

(51) Int. Cl.
*F01D 5/02* (2006.01)
(52) U.S. Cl. ........................ 416/144; 416/119; 416/145; 416/220 R
(58) Field of Classification Search ................. 416/119, 416/144, 145, 220 R
See application file for complete search history.

(56) References Cited

U.S. PATENT DOCUMENTS

| 4,220,055 | A |   | 9/1980  | Dubois et al. |
|-----------|---|---|---------|---------------|
| 4,803,893 | A |   | 2/1989  | Bachinski |
| 4,842,485 | A | * | 6/1989  | Barber ........................ 416/144 |
| 4,879,792 | A | * | 11/1989 | O'Connor ..................... 29/889 |
| 5,018,943 | A | * | 5/1991  | Corsmeier et al. .......... 416/144 |
| 5,285,700 | A |   | 2/1994  | Lau |
| 2006/0245925 | A1 |   | 11/2006 | Brault et al. |

FOREIGN PATENT DOCUMENTS

| EP | 1 445 422 A2 | 8/2004 |
| FR | 1.429.000 | 2/1966 |

OTHER PUBLICATIONS

U.S. Appl. No. 12/052,108, filed Mar. 20, 2008, Brault, et al.

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A device for balancing a turbomachine rotor includes at least one counterweight fitted to the rotor, wherein the counterweight includes two radial bearing surfaces oriented in two opposite radial directions, the said surfaces interacting with two radial bearing surfaces made on the rotor, the counterweight being held against the rotor by an axial retention device. In particular, the axial retention device can be a bolt with a nut, the bolt holding the counterweight against a coupling flange fixed ly attached to the rotor, including an axial bearing surface and the radial bearing surfaces.

16 Claims, 3 Drawing Sheets

US 7,491,031 B2

BALANCING DEVICE OF A TURBOMACHINE ENGINE

CROSS-REFERENCE TO RELATED APPLICATIONS:

The present application claims priority to French Application No. 05 51127, filed Apr. 29, 2005, the entire contents of which are hereby incorporated hereby by reference.

FIELD OF THE INVENTION

The present invention relates to the field of turbomachines and in particular that of gas turbine engines. It relates to a device for balancing rotating parts of the machine.

BACKGROUND OF THE INVENTION

Any rotating part of a turbomachine must be balanced after manufacture in order to ensure vibration-free operation. Most frequently the procedure is to place counterweights whose weight is determined according to the lack of balance and the distance to the axis of rotation of the machine. If possible, advantage is taken of the bolting of the flanges between two rotating parts to insert the required weights. Thus a counterweight may be slipped onto a fastening bolt between the flange and the clamping nut. An example of this type of assembly is reported in the U.S. Pat. No. 5,285,700. In another case, the rotor comprises a special radial flange for mounting the counterweights. U.S. Pat. No. 4,803,893 describes a device for balancing a turbine rotor according to which a radial groove turned towards the axis of rotation serves as a housing for the counterweights and is made on the rim of the turbine disc.

The applicant company has set itself the objective of perfecting a counterweight mounting means that is independent of any connecting flange between two pieces of a rotating part or of two rotating parts. Specifically, in the context of modular assembly of turbomachines, each rotary module must be supplied perfectly balanced, with no balancing intervention by the person mounting the module onto another module. The mounting of a counterweight by means of connecting flanges is therefore to be avoided.

The balancing device must be as light as possible while being reliable and easy to mount.

SUMMARY OF THE INVENTION

These objectives are achieved, according to the invention, with a device for balancing a turbomachine rotor comprising at least one counterweight fitted to the rotor, characterized in that the counterweight comprises two radial bearing surfaces oriented in two opposite radial directions, the said surfaces interacting with two radial bearing surfaces made on the rotor, the counterweight being held against the rotor by an axial retention means.

Unlike the prior art devices of this type, known to the applicant company, provision is made to immobilize the counterweight via radial bearing surfaces in the two opposite directions at the same time, one radial direction turned towards the inside and the other radial direction turned towards the outside. The installation thereof is made easier and there is less risk of error by the installer.

In particular, the axial retention means is a bolt with a nut, the bolt holding the counterweight against a coupling flange fixedly attached to the rotor, comprising an axial bearing surface and the said radial bearing surfaces.

According to an advantageous embodiment of the invention, the axial bearing surface is placed between the two radial bearing surfaces, the bolt passing through the axial bearing surface. More particularly, the coupling flange comprises an axial cylindrical portion and a radial portion in which notches are made for the counterweight-attaching bolts to pass through. This device is advantageous because via notches, the weight of the coupling flange is reduced and the counterweight, once in place, holds the bolt while it is immobilized by the nut.

The invention applies in particular to a rotor comprising a disc, the coupling flange being fixedly attached to a side of the disc.

The solution of the invention makes it possible to provide very reliable counterweight assemblies. If necessary, the means of axially retaining the counterweight consists of two fastening bolts.

The invention also relates to balancing counterweights. They are in the shape of a U with a central branch and two opposite branches, the latter forming the radial bearing surfaces. More particularly, it comprises a portion forming an adjustment weight, that is to say that can be machined to obtain the required balancing weight.

In order to prevent any risk of error in assembly, according to a variant the counterweight is symmetrical relative to the plane of its central branch.

BRIEF DESCRIPTION OF THE DRAWINGS

Now, non-limiting embodiments of the invention will be described with reference to the appended drawings in which.

DETAILED DESCRIPTION OF PREFERRED EMBODIMENTS

Figure 1:
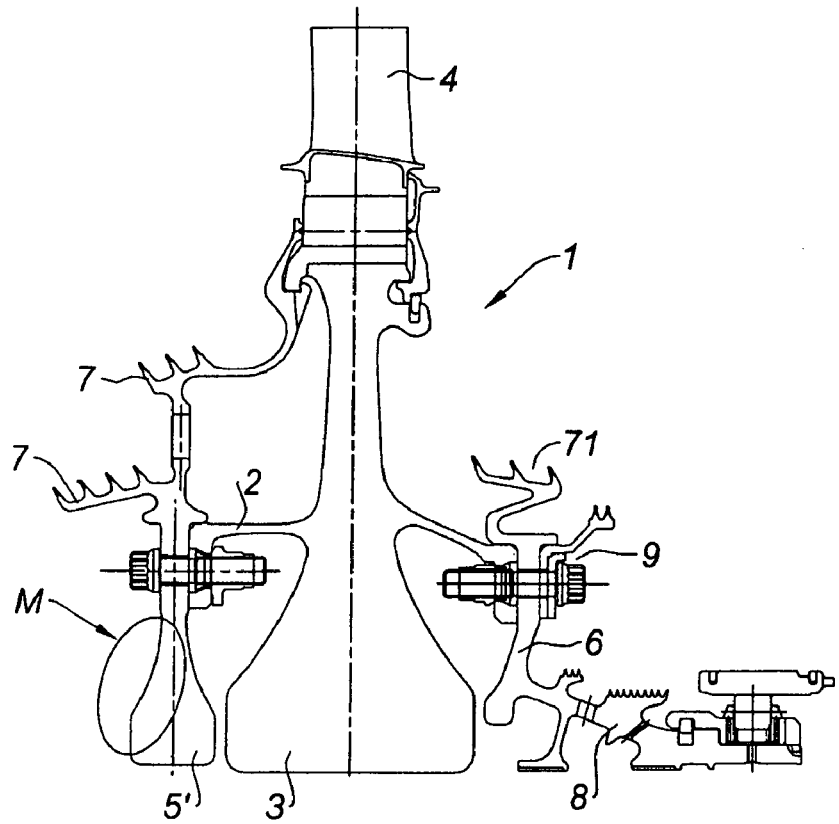
FIG. 1 represents, in axial section, a module of a high pressure turbine rotor.

FIG. 1 shows an example of an HP turbine rotor module seen in half section along its axis of rotation XX. This module 1 here consists of a turbine disc 3 with its fins 4 mounted on its peripheral rim. Upstream of the gaseous outflow in operation, the disc 3 is fixedly attached to a disc 5' which supports labyrinth seal elements 7. The disc 5' is bolted onto a coupling flange 2 machined on the disc 3. Downstream, the disc 3 is fixedly attached to a disc 6 supporting labyrinth seal elements 7' and extended by a trunnion 8 for mounting a turbine support bearing. This rotor comprises, on the downstream balancing plane, balancing weights 9 that are associated with the bolts for mounting the disc 6 onto the disc 3. This mounting does not form part of the invention. It is achieved according to the prior art.

A balancing device according to the invention is provided on the upstream balancing plane, in the zone M surrounded by an oval line. This zone is independent of any connection with another part.

Figure 2:
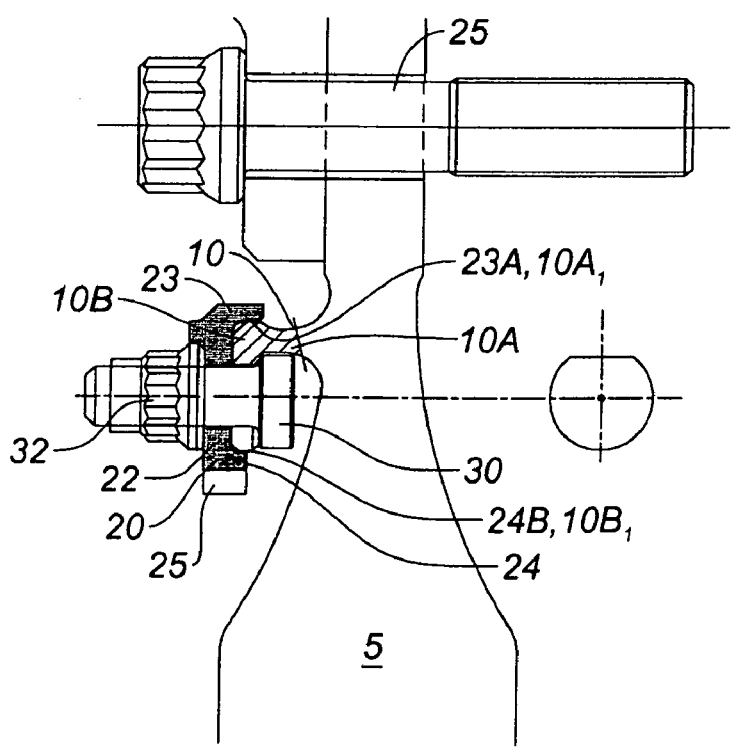
FIG. 2 represents in detail, in axial section, a module according to FIG. 1 incorporating the device of the invention.

With reference to FIG. 2, a disc 5, corresponding to the disc 5' of FIG. 1, modified to support counterweights according to the invention, can be seen. The disc 5 is fixedly attached to the disc 3 by being bolted onto the flange 2 that is not represented in this figure. The coupling flange downstream of the compressor after assembly is shown; a bolt 25 is engaged between the two, without the nut.

A coupling flange 10 is machined on the upstream side of the disc 5. This flange, in the shape of a bracket seen in axial section, comprises an axial cylindrical portion 10A and a radial portion 10B. A counterweight 20 is held against the flange 10 by a bolt 30 and its nut 32. The counterweight 20 comprises a central portion 22 from which extend two legs 23 and 24 forming radial bearing surfaces 23A and 24B, opposite one another in the radial direction. The leg 23 rests on the bearing surface 10A1 of the cylindrical portion 10A. The leg rests on the bearing surface 10B1, see also FIGS. 3 and 4. The counterweight also comprises a portion 25 forming an adjustment weight. This portion is machined if necessary to adjust the weight.

Figure 4:
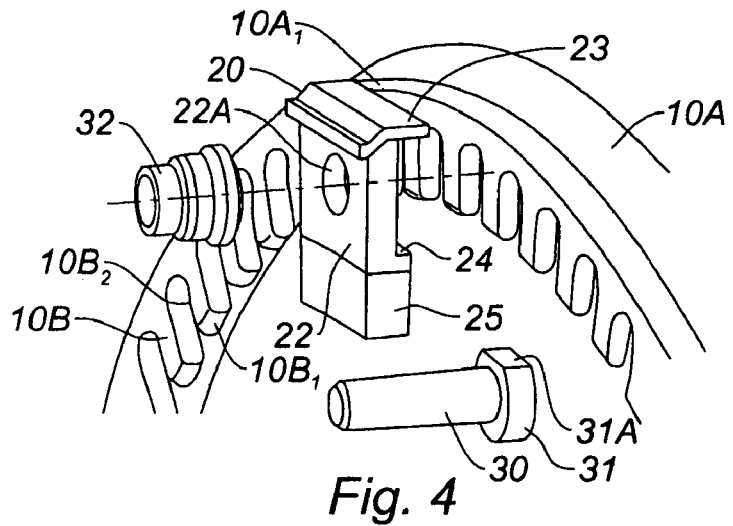
FIG. 4 illustrates the order of mounting the counterweight of FIG. 3.

The bolt 30, that is seen on its own in FIG. 4, has a head 31 with a flat 31A which rests against the inner face of the cylindrical portion 10A. In this manner, the head is prevented from rotating about its axis when it is in place.

Figure 3:
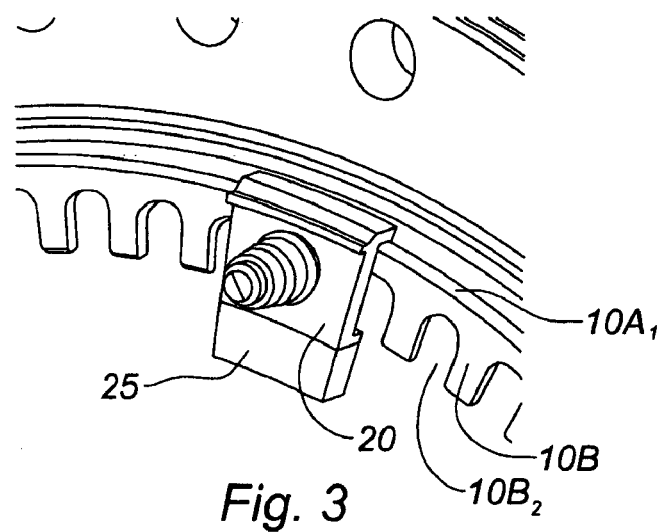
FIG. 3 shows, in perspective, a counterweight of the invention mounted on a coupling flange of the disc.

In FIGS. 3 and 4, the flange 10 is shown in perspective. The radial portion 10B is seen from the front. This portion 10B is scalloped and comprises notches 10B2 through one of which the bolt 30 passes.

The mounting of the counterweight 20 is illustrated in FIG. 4.

The weight to be added and its angular position on the disc have been determined previously by calculation. If necessary, the portion of the counterweight that makes it possible to adjust the weight, here the portion 25, is machined. The bolt 30 is inserted radially into the notch 10B2 corresponding to the position defined by the calculation. The head is housed in the space between the flange and the disc. The user ensures that the flat 31A is correctly positioned against the inner face of the cylindrical portion. The counterweight is slid onto the bolt via its orifice 22A made in the central branch 22 until it butts against the flange. The counterweight is placed so that the legs, 23 and 24 respectively, come against the two radial bearing surfaces 10A1 and 10B1. The assembly is held in place without it being necessary to hold it. All that is then required is to tighten the nut 32. Preferably the nut is of the self-locking type for safety.

Figure 5:
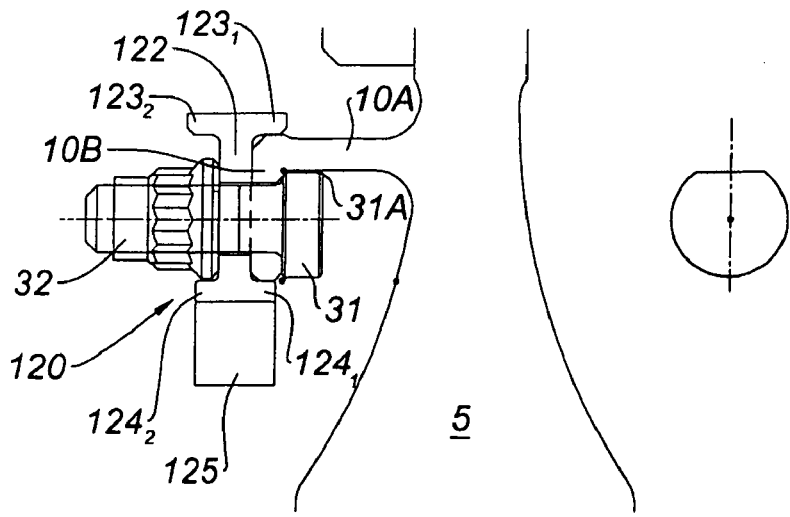
FIG. 5 shows, in axial section, a variant embodiment of the counterweight mounted on a coupling flange.

FIG. 5 shows a variant of the counterweight 120. The reference numbers are the same numbers plus 100. The counterweight differs from the previous counterweight only by its symmetry relative to the plane of the central portion 122. It comprises, on one side, the legs $123_1$ and $124_1$ and, on the other side, the legs $123_2$ and $124_2$. The portion 125 may be machined to adjust the weight of the counterweight. This geometry allows assembly equally on one side or the other.

Figure 6:
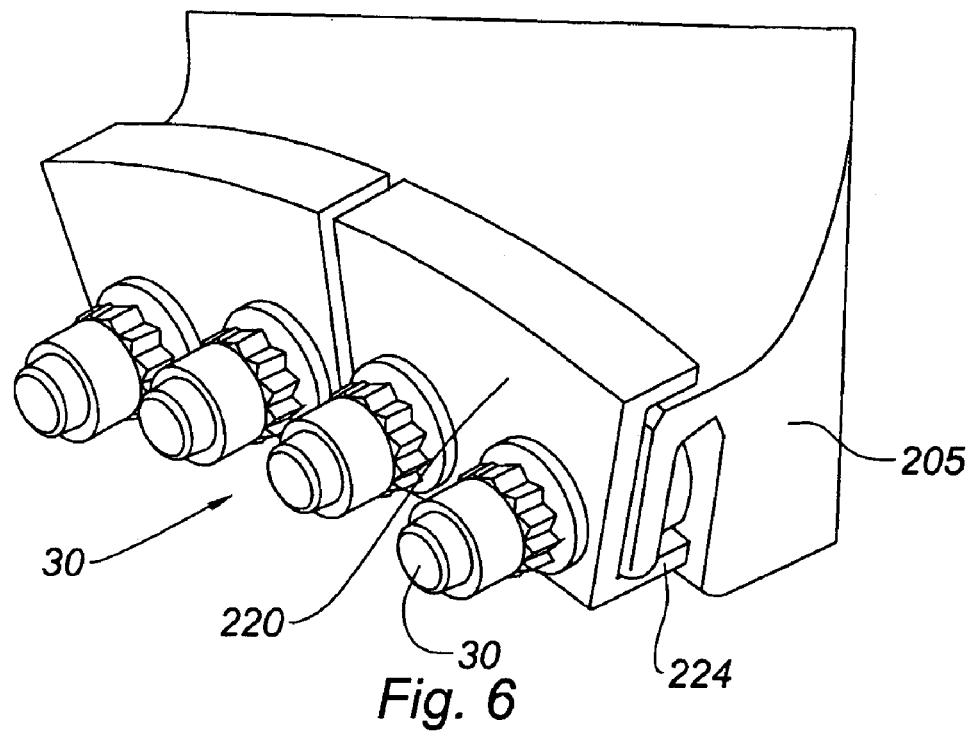
FIG. 6 shows, in partial perspective, an embodiment with two bolts.
Figure 7:
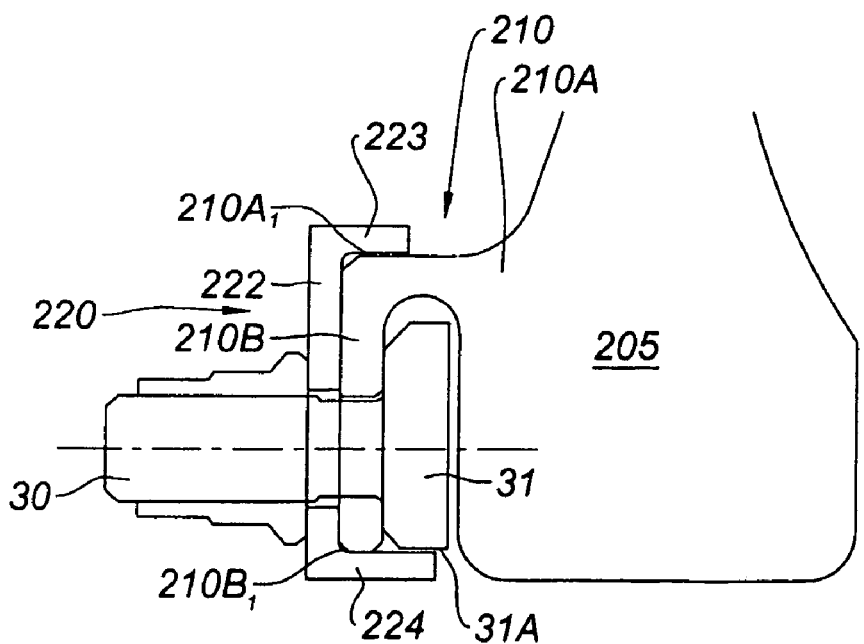
FIG. 7 shows, in axial section, the counterweight of FIG. 6.

FIGS. 6 and 7 show another variant embodiment. The reference numbers indicating the equivalent portions have the same number plus 200. The disc 205 comprises a flange 210 for coupling the counterweight which here is placed closer to the axis of the engine. The counterweight 220 is mounted on the flange 210, against the surface 210b and between the two bearing surfaces 210A1 and 210B1, by two bolts 30 placed side by side. The two bolts are identical. This arrangement enhances the safety of the mounting of the piece. According to this counterweight variant, the radially inner leg 224 has been extended. This leg goes beyond the radial portion 210B and forms an anti-rotation abutment for the heads 31 of the bolts. The heads 31 are prevented from rotating by the interaction of the flats 31A with the leg 224.

The description has referred to the balancing of a HP turbine module, but the invention is not limited to this application. The counterweight may be mounted on any type of turbomachine rotor. Furthermore, the shapes shown are not limiting. Those skilled in the art are capable of adapting the shape according to the requirements that exist elsewhere.

We claim:

1. A device for balancing a turbomachine rotor comprising a first rotor disk supporting rotor blades and including a first flange; a second rotor disk held against the first rotor disk via a first retention device, said second rotor disk supporting labyrinth seal elements and including a second flange; said device further including at least one counterweight fitted to the second flange on the second rotor disk, wherein the counterweight comprises two radial bearing surfaces oriented in two opposite radial directions, said two radial bearing surfaces interacting with two radial bearing surfaces made on the second flange on the second rotor disk, the counterweight being held against the second flange on the second rotor disk by a second retention device, said second retention device being distinct from said first retention device and being an axial retention device.

2. A device according to claim 1, wherein said axial retention device is a bolt with a nut, the bolt holding the counterweight against said second flange, said second flange comprising an axial bearing.

3. A device according to claim 2, wherein said axial bearing surface of said second flange is placed between the two radial bearing surfaces of said counterweight, the bolt passing through the axial bearing surface.

4. A device according to claim 3, wherein said second flange comprises an axial cylindrical portion and a radial portion in which notches are made for counterweight-attaching bolts to pass through.

5. A device according to claim 2, wherein the second flange is fixedly attached to an upstream side of the second rotor disc.

6. A device according to claim 2, wherein the axial retention device comprises two fastening bolts.

7. A device according to claim 1, wherein said counterweight has a shape of a U with a central branch and two opposite branches, the opposite branches forming the two radial bearing surfaces.

8. A device according to claim 1, wherein said counterweight comprises a portion forming an adjustment weight.

9. A device according to claim 7, wherein said counterweight has a symmetrical structure relative to the plane of its central branch.

10. A device according to claim 1, wherein said counterweight has a central portion between said two radial bearing surfaces, and wherein said second retention device extends axially through said central portion and has an upstream member that protrudes from an upstream side of said central portion and a downstream member that protrudes from an downstream side of said central portion.

11. A device according to claim 10, wherein said upstream member is a nut and said downstream member is a head of a bolt bolted into said nut.

12. A device according to claim 10, wherein said first retention device comprises a first plurality of bolts and nuts; and said second retention device comprises a second plurality of bolts and nuts, wherein each of said bolts of said second plurality is parallel to an axis of rotation of said turbomachine rotor.

13. A device according to claim 10, wherein said second flange is a dedicated counterweight flange that receives only counterweights and retention devices associated with said counterweights, and wherein said counterweight flange is not coupled to other elements of said turbomachine rotor.

14. A device according to claim 10, wherein said second rotor disk is located on an upstream side of said first rotor disk.

15. A device according to claim 14, wherein said second flange is located on an upstream side of said second rotor disk.

16. A device according to claim 15, wherein said second retention device comprises a second plurality of bolts and nuts, wherein each of said nuts is on an upstream side of said second retention device.

* * * * *

UNITED STATES PATENT AND TRADEMARK OFFICE
CERTIFICATE OF CORRECTION

| | | |
|---|---|---|
| PATENT NO. | : 7,491,031 B2 | Page 1 of 1 |
| APPLICATION NO. | : 11/405457 | |
| DATED | : February 17, 2009 | |
| INVENTOR(S) | : Michel Gilbert Roland Brault et al. | |

It is certified that error appears in the above-identified patent and that said Letters Patent is hereby corrected as shown below:

Cover page, item (57) Abstract, line 9, change "fixed ly" to --fixedly--.

Column 4, line 29, after bearing insert --surface--.

Signed and Sealed this

Fourteenth Day of July, 2009

JOHN DOLL
*Acting Director of the United States Patent and Trademark Office*